United States Patent
Tanaka et al.

(10) Patent No.: US 11,308,690 B2
(45) Date of Patent: Apr. 19, 2022

(54) INFORMATION PROCESSING APPARATUS AND NON-TRANSITORY COMPUTER READABLE MEDIUM FOR DETERMINING ATTRIBUTE VALUE OF VOXEL

(71) Applicant: FUJIFILM BUSINESS INNOVATION CORP., Tokyo (JP)

(72) Inventors: Yasuyuki Tanaka, Kanagawa (JP); Yuki Yokoyama, Kanagawa (JP); Tomonari Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/983,393

(22) Filed: Aug. 3, 2020

(65) Prior Publication Data

US 2021/0304493 A1 Sep. 30, 2021

(30) Foreign Application Priority Data

Mar. 25, 2020 (JP) .............................. JP2020-055030

(51) Int. Cl.
*G06T 17/10* (2006.01)
*G06T 17/20* (2006.01)
*G06T 7/73* (2017.01)

(52) U.S. Cl.
CPC ................ *G06T 17/10* (2013.01); *G06T 7/75* (2017.01); *G06T 17/205* (2013.01)

(58) Field of Classification Search
None
See application file for complete search history.

(56) References Cited

U.S. PATENT DOCUMENTS

| 6,525,729 B1* | 2/2003 | Akerman ................ G06T 15/06 |
| | | 345/422 |
| 2005/0075847 A1 | 4/2005 | Yamada et al. |
| 2011/0050691 A1* | 3/2011 | Hamedi .................. G06T 19/20 |
| | | 345/420 |
| 2021/0225074 A1* | 7/2021 | Meilland ................ G06T 17/20 |

FOREIGN PATENT DOCUMENTS

JP 4208191 B2 1/2009

* cited by examiner

*Primary Examiner* — Tize Ma
(74) *Attorney, Agent, or Firm* — Oliff PLC

(57) ABSTRACT

An information processing apparatus includes a processor configured to acquire volume data representing three-dimensional space using multiple voxels, data containing geometric layer and at least one attribute layer, geometric layer formed by geometric voxels included in multiple voxels, each geometric voxels assigned=a three-dimensional shape of a target object, at least one attribute layer formed by attribute voxels included in multiple voxels, each attribute voxels assigned attribute value of target object or attribute value around the target object, at least one attribute layer formed by voxels having multiple resolution levels, attribute, voxel position, and resolution level, and if voxel corresponding to the specified voxel position in an attribute layer corresponding to the attribute in the volume data and to a resolution level coinciding with the resolution level is absent, determine an attribute value of voxel corresponding to the specified voxel position and resolution level in attribute layer.

20 Claims, 11 Drawing Sheets

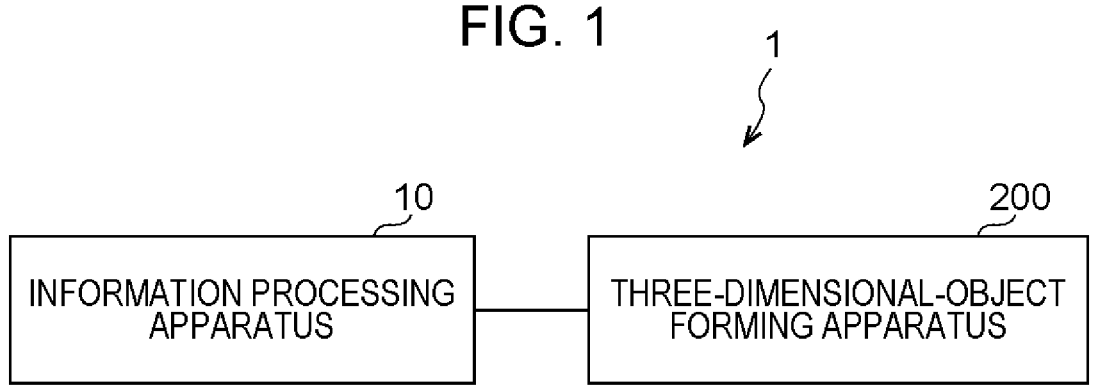
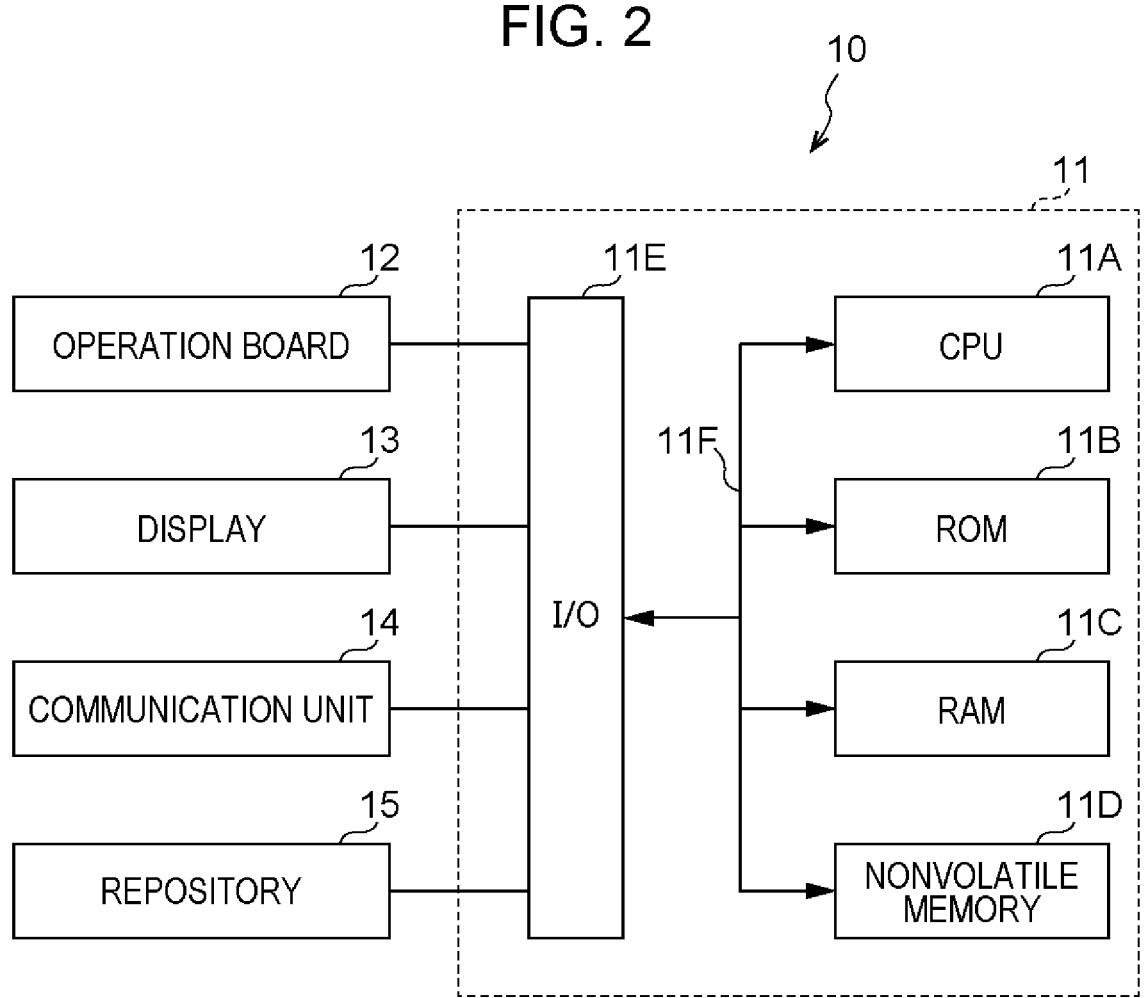

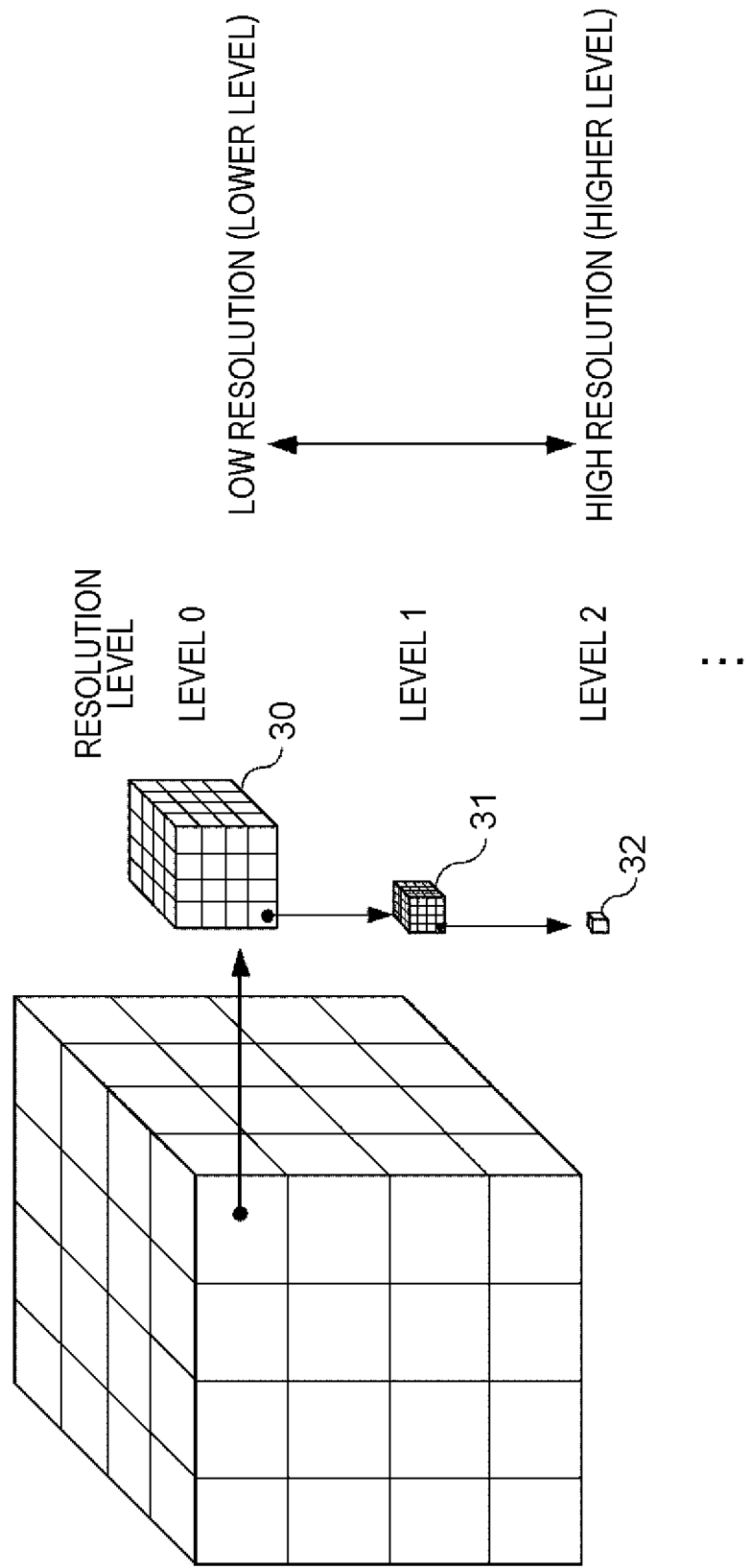

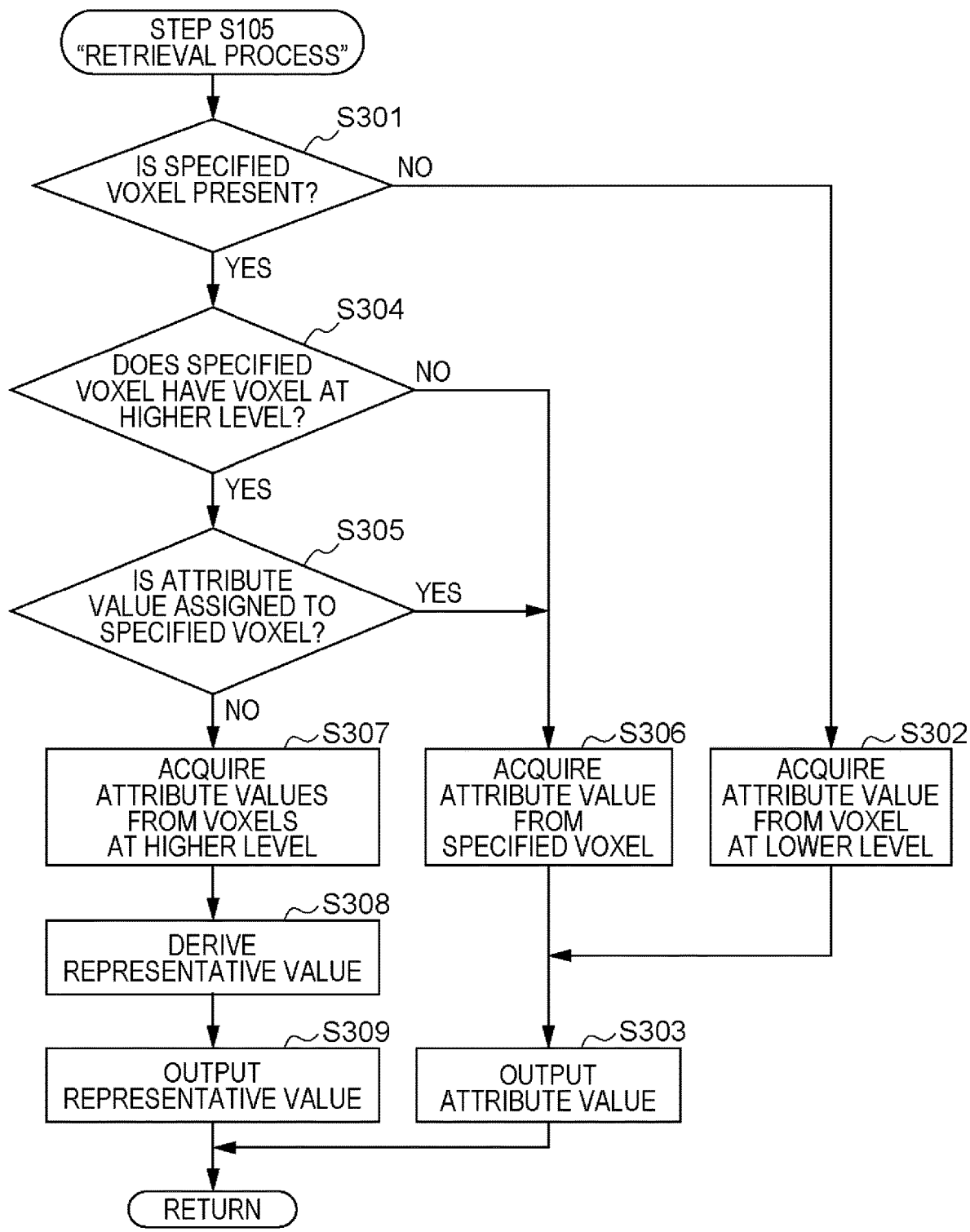

INFORMATION PROCESSING APPARATUS AND NON-TRANSITORY COMPUTER READABLE MEDIUM FOR DETERMINING ATTRIBUTE VALUE OF VOXEL

CROSS-REFERENCE TO RELATED APPLICATIONS

This application is based on and claims priority under 35 USC 119 from Japanese Patent Application No. 2020-055030 filed Mar. 25, 2020.

BACKGROUND

(i) Technical Field

The present disclosure relates to an information processing apparatus and a non-transitory computer readable medium storing a program.

(ii) Related Art

Japanese Patent No. 4208191 discloses a method of generating volume data that integrates a shape and a physical quantity. In the method, which uses a computer, external data that contains geometric data of an object is acquired in an external data acquiring step, the external data is entered into the computer in an external data entering step, the external data is divided into cube-shaped geometric cells having boundary planes orthogonal to one another by octree division in a geometric data dividing step, geometric data is stored for each geometric cell, a physical quantity of the object is divided into physical quantity cells that differ for each physical quantity by octree division in a physical quantity dividing step, and a physical quantity is stored for each physical quantity cell.

SUMMARY

In recent years, instruments such as a magnetic resonance imaging (MRI) scanner and a laser scanner are used to capture a shape of a three-dimensional structure (hereinafter referred to as a "three-dimensional body"), and techniques using voxels have heavily been used to represent the shape.

For example, for an analysis of performance characteristics of a three-dimensional structure, in some cases, each voxel in voxel data representing a three-dimensional body is assigned information representing the three-dimensional body (hereinafter, referred to as "geometric information"), such as a position and a signed distance field, and information representing an attribute that corresponds to the voxel position (hereinafter, referred to as "attribute information), such as a material property, physical characteristics, and an analysis value regarding the three-dimensional structure.

However, in voxel data representing a three-dimensional body, a region where high-resolution representation is required for geometric information because of, for example, a large geometric change does not necessarily coincide with a region where high-resolution representation is required for attribute information because of, for example, a large change in physical characteristics.

Thus, if a single resolution level is assigned to voxels, a huge amount of data is likely to be required in consideration of geometric and attribute information.

Aspects of non-limiting embodiments of the present disclosure relate to providing an information processing apparatus and a non-transitory computer readable medium, which stores an information processing program, that can reduce the amount of data in consideration of geometric and attribute information compared with a case where a single resolution level is assigned.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire volume data, the volume data representing a three-dimensional space by using a plurality of voxels, the volume data containing a geometric layer and at least one attribute layer, the geometric layer being formed by geometric voxels included in the plurality of voxels, each of the geometric voxels being assigned a characteristic value representing a three-dimensional shape of a target object, the at least one attribute layer being formed by attribute voxels included in the plurality of voxels, each of the attribute voxels being assigned an attribute value of the target object or an attribute value in a region around the target object, each of the at least one attribute layer corresponding to an attribute and being formed by voxels having a plurality of resolution levels, an attribute, a voxel position, and a resolution level being specified, accept the specified attribute, the specified voxel position, and the specified resolution level, and if a voxel that corresponds to the specified voxel position in an attribute layer corresponding to the specified attribute in the volume data and that corresponds to a resolution level coinciding with the specified resolution level is absent, determine an attribute value of the voxel that corresponds to the specified voxel position and the specified resolution level in the attribute layer corresponding to the specified attribute.

BRIEF DESCRIPTION OF THE DRAWINGS

An exemplary embodiment of the present disclosure will be described in detail based on the following figures, wherein:

FIG. 1 is a block diagram depicting an example of a three-dimensional-object forming system according to the present exemplary embodiment;

FIG. 2 is a block diagram depicting an example of an information processing apparatus according to the present exemplary embodiment;

FIG. 4 is an illustration depicting an example of voxels used to describe resolution levels according to the present exemplary embodiment;

FIG. 12 is a flowchart depicting an example of a retrieval process according to the present exemplary embodiment.

DETAILED DESCRIPTION

Figure 3:
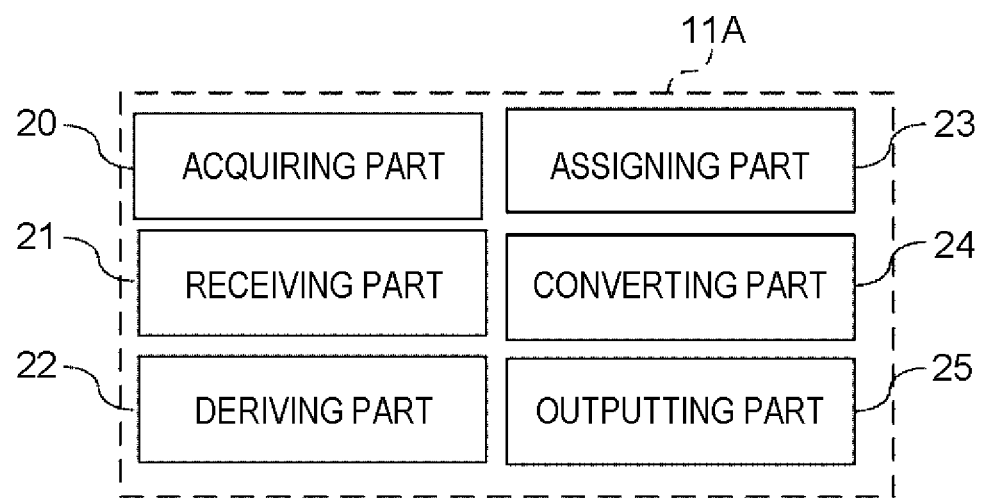
FIG. 3 is a block diagram depicting an example of a functional configuration of the information processing apparatus according to the present exemplary embodiment.

Hereinafter, an exemplary embodiment for practicing the present disclosure will be described in detail with reference to the drawings.

FIG. 1 is a block diagram of a three-dimensional-object forming system 1 according to the present exemplary embodiment. As depicted in FIG. 1, the three-dimensional-object forming system 1 includes an information processing apparatus 10 and a three-dimensional-object forming apparatus 200.

Next, a configuration of the information processing apparatus 10 according to the present exemplary embodiment will be described with reference to FIG. 2. FIG. 2 is a block diagram depicting an example of the information processing apparatus 10 according to the present exemplary embodiment.

For example, a personal computer or the like constitutes the information processing apparatus 10, which includes a controller 11. The controller 11 includes a central processing unit (CPU) 11A, a read-only memory (ROM) 11B, a random-access memory (RAM) 11C, a nonvolatile memory 11D, and an input/output interface (I/O) 11E. The CPU 11A, the ROM 11B, the RAM 11C, the nonvolatile memory 11D, and the I/O 11E are connected to each other by using a bus 11F. The CPU 11A is an example of a processor.

In addition, an operation board 12, a display 13, a communication unit 14, and a repository 15 are connected to the I/O 11E.

The operation board 12 includes, for example, a mouse and a keyboard.

The display 13 is constituted, for example, by a liquid crystal display or the like.

The communication unit 14 is an interface to perform data communication with external apparatuses, such as the three-dimensional-object forming apparatus 200.

The repository 15 is constituted by a nonvolatile memory device such as a hard disk and stores an information processing program, three-dimensional-shape data, and the like, which will be described below. The CPU 11A loads and executes the information processing program stored in the repository 15. In the description of the present exemplary embodiment, three-dimensional-shape data is assumed to be voxel data. Voxel data is an example of volume data.

Next, referring to FIG. 3, a functional configuration of the CPU 11A will be described. FIG. 3 is a block diagram depicting an example of a functional configuration of the information processing apparatus 10 according to the present exemplary embodiment.

As depicted in FIG. 3, the CPU 11A includes an acquiring part 20, a receiving part 21, a deriving part 22, an assigning part 23, a converting part 24, and an outputting part 25 as functional parts.

The acquiring part 20 acquires voxel data, which represents a three-dimensional space by using a plurality of voxels.

A user specifies an attribute, a voxel position, a resolution level, and an attribute value, and the receiving part 21 accepts the specified attribute, the specified voxel position, the specified resolution level, and the specified attribute value. The voxel data according to the present exemplary embodiment contains voxels of varying sizes (resolution levels) in accordance with the position in a three-dimensional body. For example, in a three-dimensional body, small (high-resolution) voxels are located in a region where an attribute value or the like greatly varies, and the attribute value or the like is precisely recorded. Large (low-resolution) voxels are located in a region where the attribute value or the like modestly varies. In the following description, a voxel that is located in an attribute layer corresponding to a specified attribute and at a specified position and that corresponds to a specified resolution level is referred to as a "specified voxel". A low-resolution voxel is referred to as a "voxel at a lower level", and a high-resolution voxel is referred to as a "voxel at a higher level".

Specifically, as depicted in FIG. 4, the resolution level of a voxel 30, which has the lowest resolution level assigned to the voxel data, is set to level 0, the resolution level of a voxel 31, which is obtained by dividing the voxel 30 into 64 pieces, is set to level 1, and the resolution level of a voxel 32, which is obtained by further dividing the voxel 31 into 64 pieces, is set to level 2. In this way, voxel data is formed by low-resolution voxels obtained by dividing the three-dimensional space at regular intervals and high-resolution voxels obtained by recursively dividing low-resolution voxels. Voxels adapted to the magnitude of change are obtained by recursively dividing voxels, and attribute values or the like are assigned to the voxels.

In the present exemplary embodiment, a case where voxels are divided into 64 pieces is illustrated by way of non-limiting example. Voxels may be divided into 8 pieces, or voxels may be divided into a different number of pieces at a different resolution level, for example, 27 pieces at level 0 and 64 pieces at level 1.

The deriving part 22 derives an attribute value from the voxel corresponding to a specified position in the attribute layer corresponding to a specified attribute.

An attribute layer according to the present exemplary embodiment is set for each attribute and formed by voxels each of which is assigned an attribute value of a target object or an attribute value in a region around the target object (in the following description, referred to as an "attribute voxel"). Voxel data according to the present exemplary embodiment contains a geometric layer and at least one attribute layer. The geometric layer is formed by voxels each of which is assigned a characteristic value representing the three-dimensional shape of the target object (in the following description, referred to as a "geometric voxel").

Figure 5A:
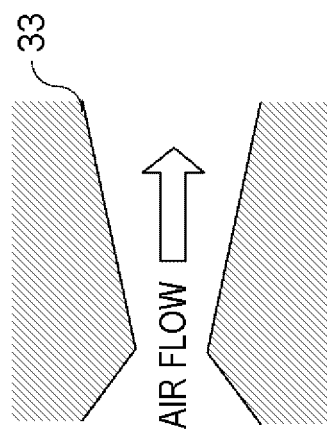
FIGS. 5A, 5B, and 5C are illustrations depicting an example of layers according to the present exemplary embodiment.
Figure 5B:
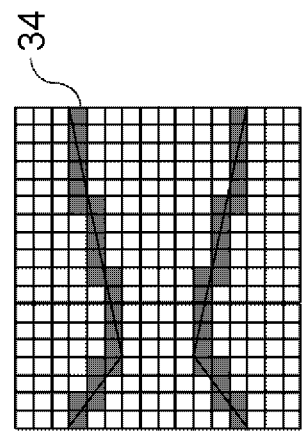
Figure 5C:
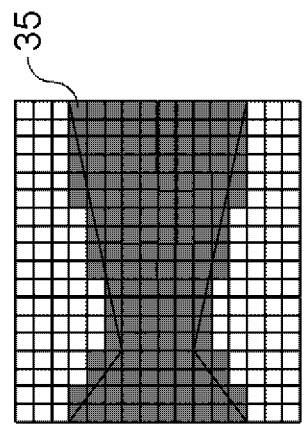

Referring to FIGS. 5A, 5B, and 5C, a geometric layer and an attribute layer will be described. FIG. 5A is a schematic illustration depicting a case in which air flows inside a three-dimensional body 33 according to the present exemplary embodiment. FIG. 5B illustrates a geometric layer formed by geometric voxels 34 according to the present exemplary embodiment, and FIG. 5C illustrates an attribute layer formed by attribute voxels 35 according to the present exemplary embodiment.

For example, as depicted in FIG. 5A, if air flows inside the three-dimensional body 33, the geometric voxels 34 and the attribute voxels 35 (representing such a parameter as the air velocity) of the three-dimensional body 33 are located as depicted in FIGS. 5B and 5C. While the geometric voxels 34 are located along the geometric surface of the three-dimensional body 33 as depicted in FIG. 5B, the attribute voxels 35 are located entirely inside the three-dimensional body 33 as depicted in FIG. 5C. In this case, if a characteristic value and an attribute value are assigned to a single voxel, managing characteristic values and attribute values is cumbersome. Further, if resolution levels of voxels described above are taken into account, managing voxels is complicated in some cases. Thus, in the present exemplary embodiment, each kind of information to be managed is separately stored as in the case of the geometric layer and the attribute layer. The geometric voxels 34, each of which is assigned a characteristic value as depicted in FIG. 5B, are managed in the geometric layer, and the attribute voxels 35, each of which is assigned an attribute value for each attribute as depicted in FIG. 5C, are managed in the attribute layer. Thus, voxels, which are located based on the geometric shape and the attribute, are easily managed.

The characteristic value assigned to a geometric voxel according to the present exemplary embodiment is a value of signed distance field (SDF), which manages a distance with a sign. In SDF, which is a known technique to represent relative positions in a three-dimensional body, the signed distance field of a voxel is set to a distance from a predetermined point, such as the center of gravity, to the nearest polygon. In such a case, the CPU 11A attaches a plus sign to a calculated distance if the predetermined point, which is the reference point to measure a distance, is included in the three-dimensional body, and a minus sign to a calculated distance if the predetermined point is not included in the three-dimensional body.

The assigning part 23 assigns an attribute value accepted by the receiving part 21 or an attribute value derived by the deriving part 22 to a voxel that is located at a specified position in the attribute layer corresponding to a specified attribute and that has a specified resolution level.

The converting part 24 converts voxel data into polygon mesh data by using a predetermined method. The predetermined method is a method to convert voxel data into polygon mesh data. Polygon mesh data combines a plurality of polygons, such as triangles, and represents a three-dimensional body by using a mesh. In the present exemplary embodiment, a case of using the marching cubes method as the predetermined method will be described by way of non-limiting example. In the marching cubes method, a predetermined surface is placed based on a pattern of presence or absence of voxels in a set formed by 8 (=2×2×2) adjacent voxels, and voxel data is converted into polygon mesh data.

The outputting part 25 outputs an attribute value of a specified voxel. The outputting part 25 also outputs voxel data to the three-dimensional-object forming apparatus 200.

In the present exemplary embodiment, a description will be given of a case where the outputting part 25 outputs an attribute value of a specified voxel. However, this is not meant to be limiting. The outputting part 25 may superimpose an attribute layer onto a geometric layer and may output both the layers to the display 13 to represent a three-dimensional body. For example, if the attribute is temperature, a color to represent temperature may be assigned to each temperature, and the color corresponding to a temperature assigned to an attribute voxel may be reflected and displayed at the corresponding position in the geometric layer.

Figure 6:
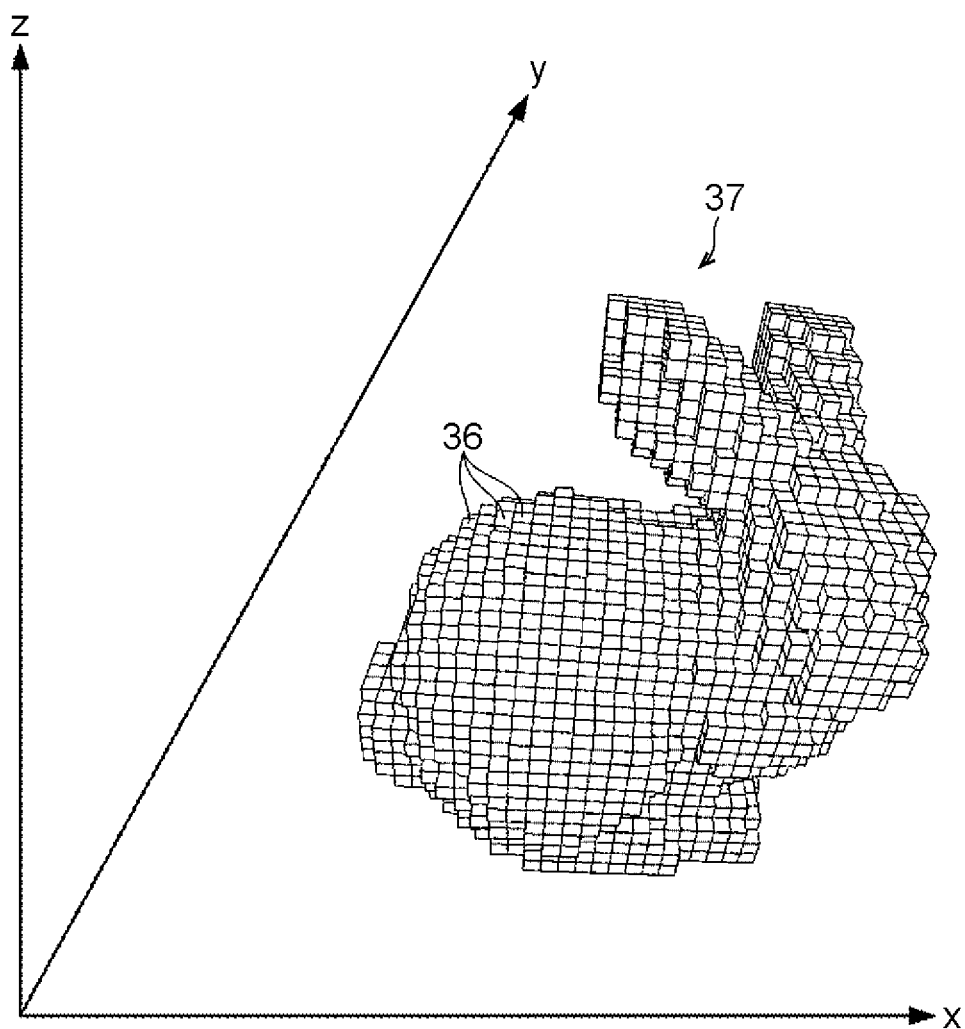
FIG. 6 is an illustration depicting an example of a three-dimensional body represented by using voxels according to the present exemplary embodiment.

Next, referring to FIG. 6, a three-dimensional body 37 represented by voxels 36 will be described. FIG. 6 is an illustration depicting an example of the three-dimensional body 37 represented by using the voxels 36 according to the present exemplary embodiment.

As depicted in FIG. 6, the three-dimensional body 37 is formed by using a plurality of voxels 36. A voxel 36 is a basic constituent of the three-dimensional body 37 and has, for example, a cuboid shape. The shape is not limited to a cuboid and may be a sphere, a solid cylinder, or the like. The voxels 36 are piled up to represent a desired three-dimensional body, which is the three-dimensional body 37.

A three-dimensional-object forming method, such as the fused deposition modeling (FDM) method or the selective laser sintering (SLS) method, is adopted to form the three-dimensional body 37. In the FDM method, a thermoplastic resin is fused and layered to form the three-dimensional body 37, and in the SLS method, a metal material in powder form is irradiated with a laser beam and sintered to form the three-dimensional body 37. Three-dimensional-object forming methods other than these two may be adopted. In the present exemplary embodiment, a description will be given of a case where the three-dimensional body 37 is formed by using the selective laser sintering method.

Figure 7:
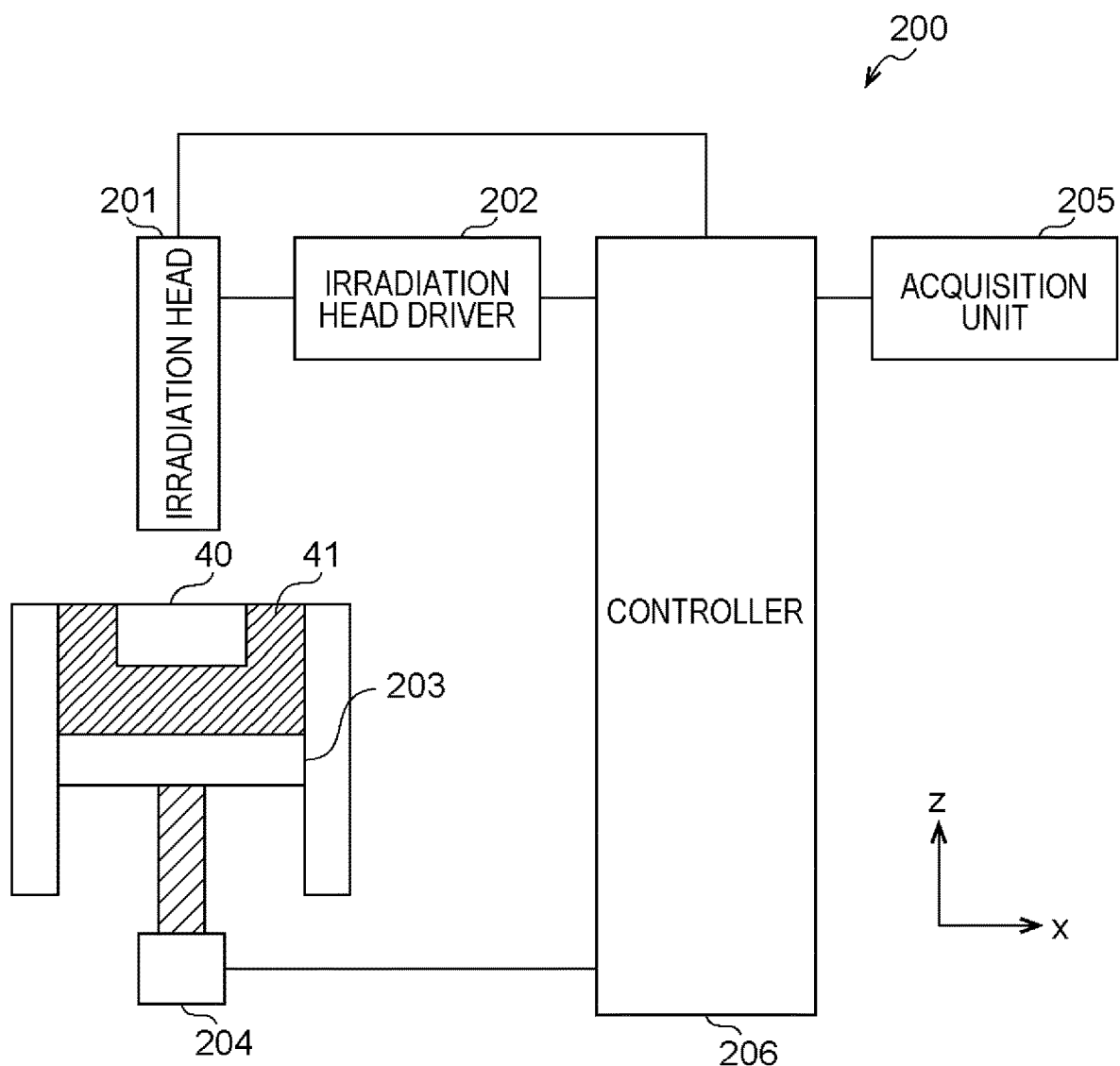
FIG. 7 is a block diagram depicting an example of a three-dimensional-object forming apparatus according to the present exemplary embodiment.

Next, a description will be given of the three-dimensional-object forming apparatus 200 to form a three-dimensional body 40 by using voxel data acquired from the information processing apparatus 10. FIG. 7 is an example of a configuration of the three-dimensional-object forming apparatus 200 according to the present exemplary embodiment. The three-dimensional-object forming apparatus 200 forms the three-dimensional body 40 by using the selective laser sintering method.

As depicted in FIG. 7, the three-dimensional-object forming apparatus 200 includes an irradiation head 201, an irradiation head driver 202, a forming pedestal 203, a forming pedestal driver 204, an acquisition unit 205, and a controller 206. The irradiation head 201, the irradiation head driver 202, the forming pedestal 203, and the forming pedestal driver 204 are an example of a forming part.

The irradiation head 201 is a laser irradiation head that irradiates a forming material 41 with laser light to form the three-dimensional body 40.

The irradiation head 201 is driven by the irradiation head driver 202, and the xy-plane is two-dimensionally scanned with laser light.

The forming pedestal 203 is driven by the forming pedestal driver 204 and moved up and down in the z-axis direction.

The acquisition unit 205 acquires voxel data obtained from the information processing apparatus 10.

In accordance with the voxel data acquired by the acquisition unit 205, the controller 206 causes the irradiation head 201 to irradiate with laser light the forming material 41 placed on the forming pedestal 203 and causes the irradiation head driver 202 to control the position to be irradiated with laser light.

Whenever one layer has been formed, the controller 206 causes the forming pedestal driver 204 to lower the forming pedestal 203 by a predetermined layering spacing and injects the forming material 41 onto the forming pedestal 203. In this way, the three-dimensional body 40 based on the voxel data is formed.

Next, a method to derive and assign an attribute value of a voxel in the present exemplary embodiment will be described with reference to FIG. 8 and FIGS. 9A, 9B, and 9C, followed by a description of an operation of the information processing apparatus 10 according to the present exemplary embodiment.

Figure 8:
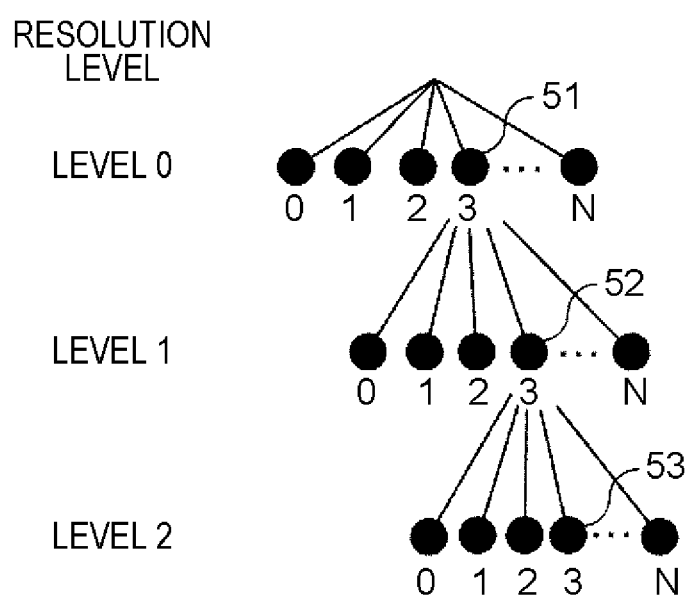
FIG. 8 is an illustration depicting an example of a data structure represented by using a multi-way tree according to the present exemplary embodiment.

First, referring to FIG. 8, a method to retrieve an attribute value assigned to a voxel will be described. FIG. 8 is an illustration depicting an example of a data structure represented by using a multi-way tree according to the present exemplary embodiment.

As depicted in FIG. 8, a multi-way tree is formed by nodes (nodal points) and edges (branches), which connect nodes with each other. Since high-resolution voxels are obtained by recursively dividing a low-resolution voxel in the present exemplary embodiment, the data structure of voxel data is represented by using a multi-way tree as depicted in FIG. 8. A node in a multi-way tree according to the present exemplary embodiment corresponds to a voxel in a layer.

For example, as depicted in FIG. 8, a multi-way tree is formed by nodes 51, which are lower-level nodes at level 0, nodes 52, which are higher-level nodes at level 1, and nodes 53 at level 2. A node 52 is created by dividing a node 51, and a node 53 is created by further dividing a node 52. Each node is associated with a voxel in an attribute layer by using a voxel number. A voxel number is uniquely determined based on the setting range for voxel data, the number of divisions for the voxel data, an attribute, a resolution level, and a position (coordinates) of a voxel. For example, if the setting range for voxels in voxel data is (9, 9, 9), voxel numbers 0 to 9 are assigned to voxels located at a position (0, 0, 0) to a position (9, 0, 0). Similarly, voxel numbers 10 to 19 are assigned to voxels located at a position (0, 1, 0) to a position (9, 1, 0). In this way, in the description of the present exemplary embodiment, it is assumed that voxel numbers are consecutively assigned to voxels in an attribute layer in the x-axis direction, the y-axis direction, and the z-axis direction in this order, starting from the origin.

As an example, in the following description, it is assumed that the setting range for voxels in voxel data is $(n_{0x}, n_{0y}, n_{0z})$ and the numbers of divisions to divide a voxel at level 0 to voxels at level 1 are given by $(n_{1x}, n_{1y}, n_{1z})$. For example, if a specified resolution level is level 1 and a specified position (coordinates) is given by $(x_1, y_1, z_1)$, the voxel number of a voxel at level 1 is derived by using the following equations.

$$x_0 = \text{floor}\left(\frac{x_1}{n_{0x}}\right) \quad (1)$$

$$y_0 = \text{floor}\left(\frac{y_1}{n_{0y}}\right) \quad (2)$$

$$z_0 = \text{floor}\left(\frac{z_1}{n_{0z}}\right) \quad (3)$$

$$N_0 = x_0 + n_{0x}(y_0 + n_{0y} z_0) \quad (4)$$

$$x_{1b} = \text{mod}(x_1, n_{1x}) \quad (5)$$

$$y_{1b} = \text{mod}(y_1, n_{1y}) \quad (6)$$

$$z_{1b} = \text{mod}(z_1, n_{1z}) \quad (7)$$

$$N_{1b} = x_{1b} + n_{1x}(y_1 + n_{1y} z_1) \quad (8)$$

Here, the parameter $x_0$ is the x coordinate of the voxel at level 0 corresponding to the specified position, and the parameter $y_0$ is the y coordinate of the voxel at level 0 corresponding to the specified position. The parameter $z_0$ is the z coordinate of the voxel at level 0 corresponding to the specified position. The parameter $N_0$ is the voxel number of the voxel at level 0 corresponding to the specified position, and the parameter $x_{1b}$ is the x coordinate of the voxel at level 1 corresponding to the specified position with respect to the identified voxel at level 0. The parameter $y_{1b}$ is the y coordinate of the voxel at level 1 corresponding to the specified position with respect to the identified voxel at level 0. The parameter $z_{1b}$ is the z coordinate of the voxel at level 1 corresponding to the specified position with respect to the identified voxel at level 0. The parameter $N_{1b}$ is the voxel number of the voxel at level 1 corresponding to the specified position. The function floor is a floor function that returns the largest integer not greater than an argument that is a real number obtained by division and the function mod is a remainder function that returns a remainder obtained by division.

Thus, Equations 1 to 3 above are used to identify the voxel at level 0 that corresponds to the specified position, and Equation 4 is used to derive the voxel number of the identified voxel at level 0. Equations 5 to 7 are further used to identify the voxel at level 1, which is located at a higher level than the level of the identified voxel at level 0 and corresponds to the specified position, and Equation 8 is used to derive the voxel number of the identified voxel at level 1. Thus, Equations 1 to 8 are used to derive the voxel numbers at levels 0 and 1, and the derived voxel numbers at levels 0 and 1 are used to determine the attribute value of the specified voxel. In other words, an attribute, a position, and a resolution level are specified, and the specified attribute, the specified position, and the specified resolution level are used to identify both the node corresponding to the specified voxel and a node at a lower level, to which the node corresponding to the specified voxel belongs. Then, both the attribute value of the specified voxel and the attribute value of a voxel at a lower level, to which the specified voxel belongs, are acquired.

Figure 9A:
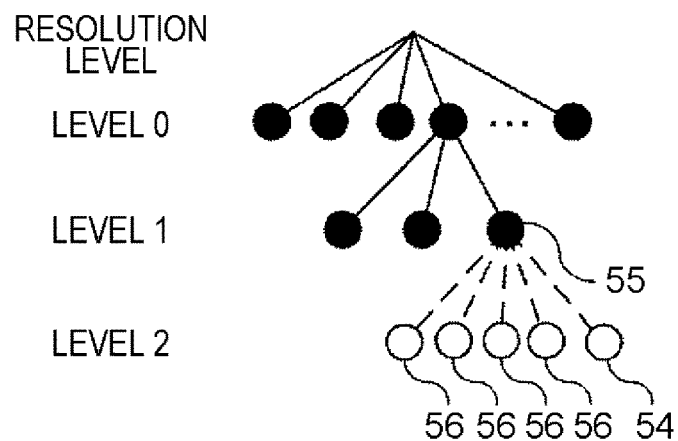
FIGS. 9A, 9B, and 9C are illustrations each depicting an example of a data structure used to describe derivation of an attribute value according to the present exemplary embodiment.
Figure 9B:
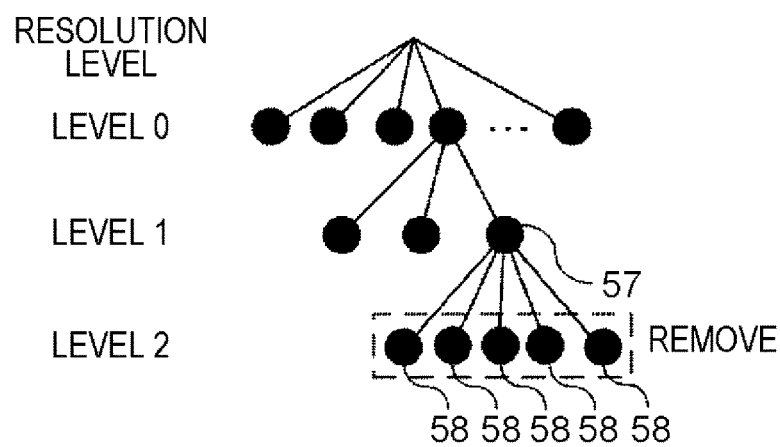
Figure 9C:
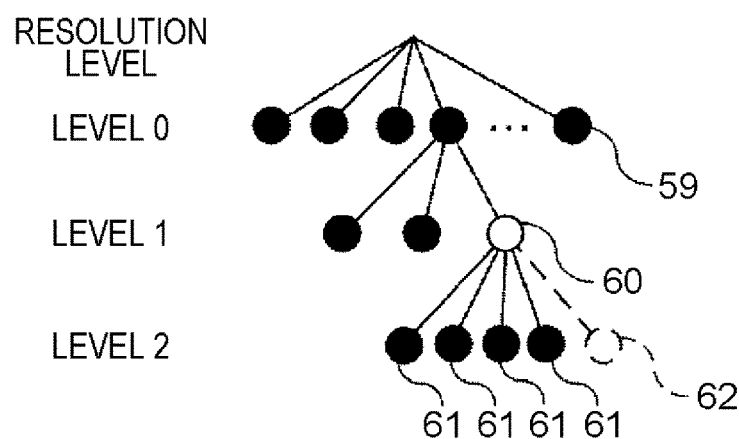

Next, referring to FIGS. 9A to 9C, a description will be given of a case where the resolution level of the voxel corresponding to the specified position does not coincide with the specified resolution level. FIG. 9A is an illustration depicting an example of a data structure used to describe how to determine an attribute value in a case where a voxel corresponding to the specified position does not have the specified resolution level. FIG. 9B is an illustration depicting an example of a data structure used to describe how to determine an attribute value in a case where a voxel corresponding to the specified position has one or more voxels having a higher resolution level than the specified resolution level. FIG. 9C is an illustration depicting an example of a data structure used to describe retrieval of an attribute value in a case where a voxel is specified.

First, referring to FIG. 9A, a description will be given of a case where a node 54 corresponding to a voxel at level 2 is specified but only nodes at level 1 or lower, such as a node 55, which have a lower resolution level, are present at the specified position. In this case, the information processing apparatus 10 divides the node 55 at level 1 and adds the node 54 and nodes 56 at level 2. Further, a specified attribute value is assigned to the node 54, and an attribute value acquired from the node 55 is assigned to the nodes 56. In other words, the specified attribute value is assigned to the node 54 corresponding to the specified voxel, and the attribute value acquired from the node 55, which is located at a lower level, is assigned to the nodes 56, which are added after the division and are different from the node 54 corresponding to the specified voxel.

Next, referring to FIG. 9B, a description will be given of a case where a node 57 corresponding to a voxel at level 1 is specified but nodes 58 at level 2 located at a higher level are present. In this case, the information processing apparatus 10 removes the nodes 58 at a higher level. If an attribute value is specified, the information processing apparatus 10 assigns the specified attribute value to a node corresponding to the specified voxel.

In the present exemplary embodiment, by way of non-limiting example, a description has been given of a case where if a node is present at a higher level than the level of the node corresponding to the specified voxel, the node at a higher level is removed. If one or more nodes are present at a higher level, the nodes at a higher level may be maintained instead of being removed, and further the attribute value specified for the specified voxel may be assigned to each node at the higher level instead of removing the nodes.

Next, referring to FIG. 9C, a description will be given of a case where an attribute value is retrieved from a node corresponding to a specified voxel. For example, as depicted in FIG. 9C, if a node 59 to which an attribute value is assigned is specified, the information processing apparatus 10 retrieves the attribute value assigned to the node 59 and outputs the retrieved value. If a node 60 to which no attribute value is assigned is specified and the node 60 has nodes 61 at a higher level that belong to the node 60, the information processing apparatus 10 acquires the attribute values assigned to the nodes 61 at a higher level, derives a representative value, and outputs the derived representative value as the attribute value assigned to the node 60. If a node having a specified resolution level, such as a node 62, is not present and only the node 60, which is located at a lower level, is present, the information processing apparatus 10 acquires the attribute value assigned to the node 60 at a lower level and outputs the acquired attribute value as the attribute value assigned to the node 62.

Accordingly, if a node corresponding to a specified voxel is not present or is not assigned an attribute value, an attribute value is retrieved.

In the present exemplary embodiment, a description has been given of a case where if a node having a specified resolution level, such as the node 62, is not present and only the node 60, which corresponds to a voxel at a lower level, is present, the attribute value assigned to the node 60 at a lower level is output. However, this is not meant to be limiting. For example, if the nodes 61 that have a resolution level equivalent to the resolution level of the node 62 and that belong to the same node, which is the node 60, are present, the attribute values assigned to the nodes 61 may be acquired to derive a representative value, and the derived representative value may be output as the attribute value assigned to the node 62.

In the present exemplary embodiment, a description has been given of a case where attribute values are acquired from one or more nodes that belong to the node to which the node corresponding to a specified voxel belongs, and a representative value is derived. However, this is not meant to be limiting. Attribute values may be acquired from voxels located near the specified voxel. For example, if a voxel at level 0 is specified, attribute values may be acquired from voxels at level 0, level 1, level 2, and the like that belong to voxels adjacent to the specified voxel, and a representative value may be derived.

A representative value according to the present exemplary embodiment is derived from acquired attribute values by using statistics and is, for example, the average, the maximum, the minimum, the sum, or the median value of the acquired attribute values. Further, a representative value may be derived by using weighted averaging. For example, a representative value may be derived by using distances from a specified voxel to voxels located around the specified voxel and attribute values assigned to the voxels located around the specified voxel.

Figure 10:
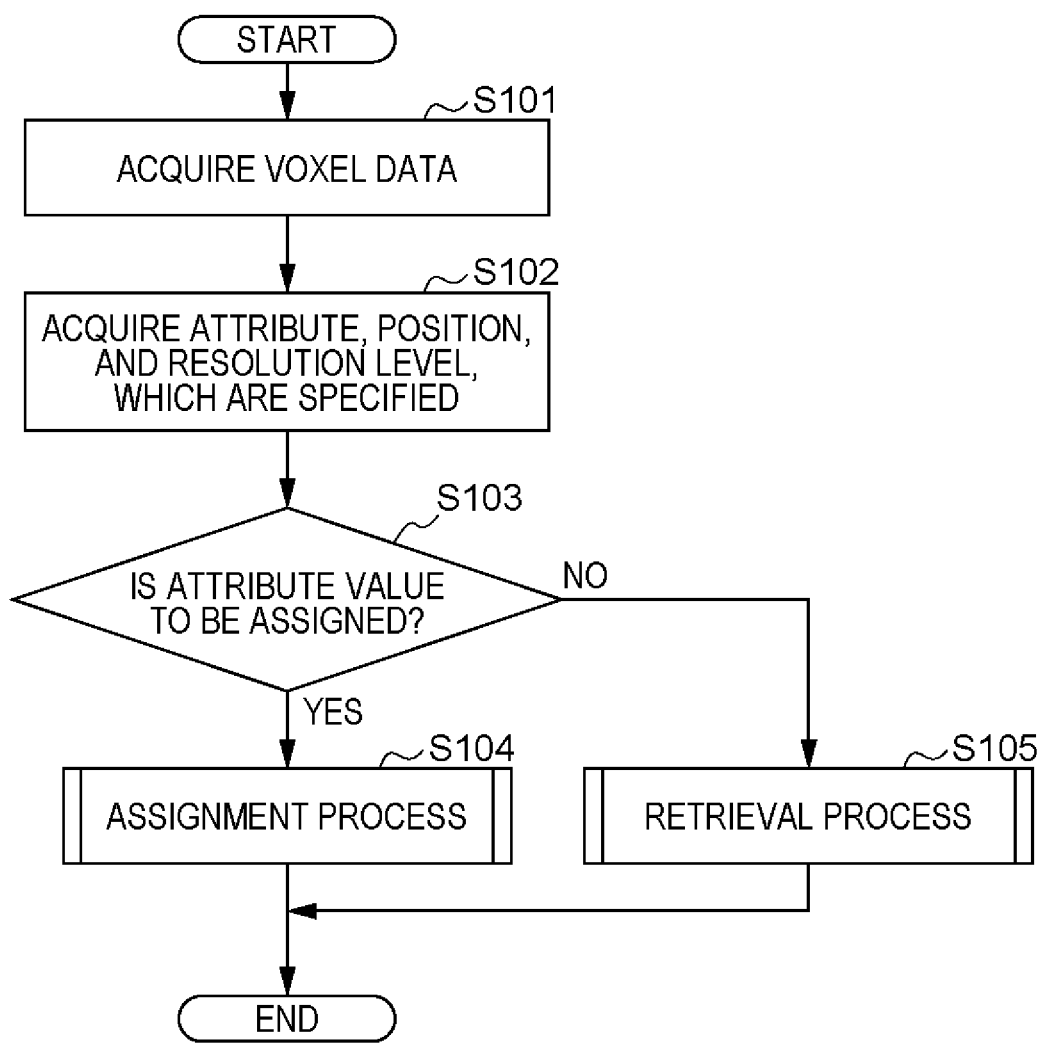
FIG. 10 is a flowchart depicting an example of information processing according to the present exemplary embodiment.
Figure 11:
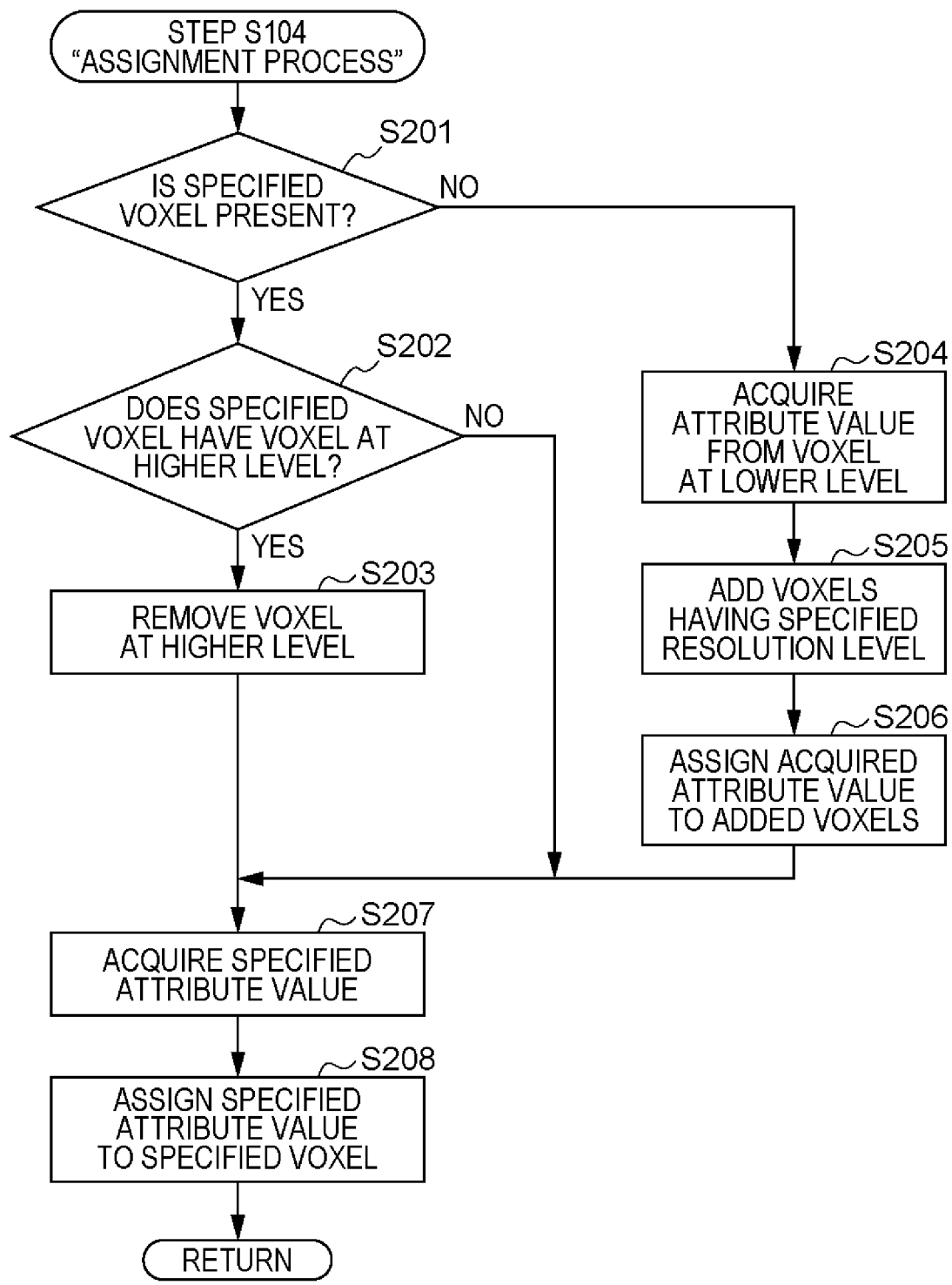
FIG. 11 is a flowchart depicting an example of an assignment process according to the present exemplary embodiment.

Next, referring to FIGS. 10 to 12, an operation of an information processing program according to the present exemplary embodiment will be described. FIG. 10 is a flowchart depicting an example of information processing according to the present exemplary embodiment. The CPU 11A loads the information processing program from the ROM 11B or the nonvolatile memory 11D and executes the program, and the information processing depicted in FIG. 10 is performed. The information processing depicted in FIG. 10 is performed, for example, in response to an input from the user to execute the information processing program.

In step S101, the CPU 11A acquires voxel data.

In step S102, the CPU 11A acquires an attribute, a voxel position, and a resolution level of a voxel, which are specified.

In step S103, the CPU 11A determines whether an attribute value is to be assigned. If an attribute value is to be assigned (YES in step S103), the CPU 11A makes the process proceed to step S104. In contrast, if an attribute value is not to be assigned (an attribute value is to be retrieved) (NO in step S103), the CPU 11A makes the process proceed to step S105.

In step S104, the CPU 11A performs a process of assigning an attribute value. Details on the assignment process will be described with reference to FIG. 11 below.

In step S105, the CPU 11A performs a process of retrieving an attribute value. Details on the retrieval process will be described with reference to FIG. 12 below.

Next, referring to FIG. 11, an operation of a program for the assignment process according to the present exemplary embodiment will be described. FIG. 11 is a flowchart depicting an example of the assignment process according to the present exemplary embodiment. The CPU 11A loads the program for the assignment process from the ROM 11B or the nonvolatile memory 11D and executes the program, and the assignment process depicted in FIG. 11 is performed. The assignment process depicted in FIG. 11 is performed, for example, in response to an input from the information processing program to execute the program for the assignment process.

In step S201, the CPU 11A determines whether the specified voxel is present. If the specified voxel is present (YES in step S201), the CPU 11A makes the process proceed to step S202. In contrast, if the specified voxel is not present (NO in step S201), the CPU 11A makes the process proceed to step S204.

In step S202, the CPU 11A determines whether the specified voxel has at least one voxel at a higher level. If at least one voxel is present at a higher level (YES in step S202), the CPU 11A makes the process proceed to step S203. In contrast, if no voxel is present at a higher level (NO in step S202), the CPU 11A makes the process proceed to step S207.

In step S203, the CPU 11A removes the at least one voxel at a higher level so that the specified voxel becomes the highest.

In step S204, the CPU 11A acquires an attribute value from a voxel that is located at a lower level and that corresponds to the specified position.

In step S205, the CPU 11A divides the voxel at a lower level and adds voxels having the specified resolution level.

In step S206, the CPU 11A assigns the attribute value acquired from the voxel at a lower level to the voxels added after the division.

In step S207, the CPU 11A acquires the specified attribute value.

In step S208, the CPU 11A assigns the specified attribute value to the specified voxel.

Next, referring to FIG. 12, an operation of a program for the retrieval process according to the present exemplary embodiment will be described. FIG. 12 is a flowchart depicting an example of the retrieval process according to the present exemplary embodiment. The CPU 11A loads the program for the retrieval process from the ROM 11B or the nonvolatile memory 11D and executes the program, and the retrieval process depicted in FIG. 12 is performed. The retrieval process depicted in FIG. 12 is performed, for example, in response to an input from the information processing program to execute the program for the retrieval process.

In step S301, the CPU 11A determines whether the specified voxel is present. If the specified voxel is present (YES in step S301), the CPU 11A makes the process proceed to step S304. In contrast, if the specified voxel is not present (NO in step S301), the CPU 11A makes the process proceed to step S302.

In step S302, the CPU 11A acquires an attribute value from a voxel that is located at a lower level and that corresponds to the specified position.

In step S303, the CPU 11A outputs the acquired attribute value.

In step S304, the CPU 11A determines whether the specified voxel has at least one voxel at a higher level. If at least one voxel is present at a higher level (YES in step S304), the CPU 11A makes the process proceed to step S305. In contrast, if no voxel at a higher level is present (NO in step S304), the CPU 11A makes the process proceed to step S306.

In step S305, the CPU 11A determines whether an attribute value is assigned to the specified voxel. If an attribute value is assigned to the specified voxel (YES in step S305), the CPU 11A makes the process proceed to step S306. In contrast, if an attribute value is not assigned to the specified voxel (NO in step S305), the CPU 11A makes the process proceed to step S307.

In step S306, the CPU 11A acquires the attribute value from the specified voxel.

In step S307, the CPU 11A acquires attribute values from voxels at a higher level.

In step S308, the CPU 11A derives a representative value from the acquired attribute values.

In step S309, the CPU 11A outputs the derived representative value.

As described above, in the present exemplary embodiment, voxels having a plurality of resolution levels are created in accordance with the magnitude of change in each of the geometric layer and the attribute layer. Accordingly, the amount of data is reduced in consideration of geometric and attribute information compared with a case where a single resolution level is assigned.

In the present exemplary embodiment, a case where each voxel (node) retains an assigned attribute value has been described. However, this is not meant to be limiting. For example, an attribute value of a voxel (node) may be set to the difference between an attribute value assigned to a voxel (node) at a lower level and an attribute value assigned to a voxel (node) at a higher level. In this case, a voxel (node) at level 0, which is the lowest level, retains the attribute value assigned to the voxel at level 0. A voxel (node) at level 1 or higher retains the difference between the attribute value assigned to the voxel (node) at level 1 or higher and the attribute value assigned to a voxel (node) at a lower level. Assigning the difference to a voxel (node) reduces the amount of data retained by the voxel (node), and the magnitude of reduction in the amount of data increases as the number of significant digits of an assigned attribute value increases and local variation in the attribute value decreases.

The present disclosure has been described by using the exemplary embodiment as above, but the scope of the present disclosure is not limited to the range described by using the above exemplary embodiment. Various modifications and improvements to the above exemplary embodiment are possible without departing from the spirit of the present disclosure, and embodiments incorporating such modifications or improvements are also within the technical scope of the present disclosure.

For example, in the present exemplary embodiment, a description has been given of a case where the information processing apparatus 10 and the three-dimensional-object forming apparatus 200, which forms a three-dimensional body in accordance with three-dimensional-shape data, are separately installed. However, this configuration is not meant to be limiting. The three-dimensional-object forming apparatus 200 may have a function of the information processing apparatus 10.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Further, in the above exemplary embodiment, a description has been given of a case where the information processing program, which determines an attribute value, is stored in the repository 15, but the present disclosure is not limited to this example. The information processing program according to the present exemplary embodiment may be recorded in a computer-readable recording medium and provided. For example, the information processing program according to the present exemplary embodiment may be recorded on an optical disc, such as a compact disc ROM (CD-ROM) or a digital versatile disc ROM (DVD-ROM), and provided. The information processing program according to the present exemplary embodiment may be recorded in a semiconductor memory, such as a universal-serial-bus (USB) memory or a memory card, and provided. Further, the information processing program according to the present exemplary embodiment may be acquired from an external apparatus via a communication line connected to the communication unit 14.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire volume data,
the volume data representing a three-dimensional space by using a plurality of voxels,
the volume data containing a geometric layer and at least one attribute layer,
the geometric layer being formed by geometric voxels included in the plurality of voxels, each of the geometric voxels being assigned a characteristic value representing a three-dimensional shape of a target object,
the at least one attribute layer being formed by attribute voxels included in the plurality of voxels, each of the attribute voxels being assigned an attribute value of the target object or an attribute value in a region around the target object,
each of the at least one attribute layer corresponding to an attribute and being formed by voxels having a plurality of resolution levels,
an attribute, a voxel position, and a resolution level being specified,
accept the specified attribute, the specified voxel position, and the specified resolution level, and
if a voxel that corresponds to the specified voxel position in an attribute layer corresponding to the specified attribute in the volume data and that corresponds to a resolution level coinciding with the specified resolution level is absent,
determine an attribute value of the voxel that corresponds to the specified voxel position and the specified resolution level in the attribute layer corresponding to the specified attribute, the attribute value being determined using a multi-way tree equation set to identify a voxel that corresponds to the specified voxel position at the attribute layer.

2. The information processing apparatus according to claim 1,
wherein the voxels having the plurality of resolution levels include one or more lowest-resolution voxels obtained by dividing the three-dimensional space at regular intervals and one or more high-resolution voxels obtained by recursively dividing the one or more lowest-resolution voxels.

3. The information processing apparatus according to claim 2,
wherein the processor sets an attribute value of one of the one or more high-resolution voxels to a difference between an attribute value retained by a voxel having a lower resolution level than a resolution level of the one of the one or more high-resolution voxels and an attribute value assigned to the one of the one or more high-resolution voxels.

4. The information processing apparatus according to claim 3,
wherein the processor derives an attribute value from at least one voxel corresponding to the specified voxel position in the attribute layer corresponding to the specified attribute and determines the attribute value of the voxel that corresponds to the specified voxel position and the specified resolution level.

5. The information processing apparatus according to claim 4,
wherein the attribute value is derived by using an attribute value assigned to at least one of a voxel having the same resolution level as the specified resolution level, a voxel having a higher resolution level than the specified resolution level, and a voxel having a lower resolution level than the specified resolution level among the at least one voxel corresponding to the specified voxel position.

6. The information processing apparatus according to claim 5,
wherein the processor derives the attribute value by using statistics.

7. The information processing apparatus according to claim 3,
wherein the processor
acquires the volume data,
accepts an attribute value corresponding to the specified attribute, the specified voxel position, and the specified resolution level, and
if the resolution level of the voxel that corresponds to the specified voxel position in the attribute layer corresponding to the specified attribute is lower than the specified resolution level,
adds a voxel that corresponds to the specified resolution level by dividing the voxel that corresponds to the specified voxel position, and
assigns the attribute value to the added voxel that corresponds to the specified voxel position and the specified resolution level.

8. The information processing apparatus according to claim 7,
wherein, if the voxel that corresponds to the specified voxel position has voxels obtained by dividing the voxel that corresponds to the specified voxel position, the voxels having a higher resolution level than the specified resolution level, in the attribute layer corresponding to the specified attribute, the processor removes the voxels having the higher resolution level and assigns the attribute value to the added voxel that corresponds to the specified voxel position and the specified resolution level.

9. The information processing apparatus according to claim 2,
wherein the processor derives an attribute value from at least one voxel corresponding to the specified voxel position in the attribute layer corresponding to the specified attribute and determines the attribute value of the voxel that corresponds to the specified voxel position and the specified resolution level.

10. The information processing apparatus according to claim 9,
wherein the attribute value is derived by using an attribute value assigned to at least one of a voxel having the same resolution level as the specified resolution level, a voxel having a higher resolution level than the specified resolution level, and a voxel having a lower resolution level than the specified resolution level among the at least one voxel corresponding to the specified voxel position.

11. The information processing apparatus according to claim 10,
wherein the processor derives the attribute value by using statistics.

12. The information processing apparatus according to claim 2,
wherein the processor
acquires the volume data,
accepts an attribute value corresponding to the specified attribute, the specified voxel position, and the specified resolution level, and
if the resolution level of the voxel that corresponds to the specified voxel position in the attribute layer corresponding to the specified attribute is lower than the specified resolution level,
adds a voxel that corresponds to the specified resolution level by dividing the voxel that corresponds to the specified voxel position, and
assigns the attribute value to the added voxel that corresponds to the specified voxel position and the specified resolution level.

13. The information processing apparatus according to claim 12,
wherein, if the voxel that corresponds to the specified voxel position has voxels obtained by dividing the voxel that corresponds to the specified voxel position, the voxels having a higher resolution level than the specified resolution level, in the attribute layer corresponding to the specified attribute, the processor removes the voxels having the higher resolution level and assigns the attribute value to the added voxel that corresponds to the specified voxel position and the specified resolution level.

14. The information processing apparatus according to claim 1,
wherein the processor derives an attribute value from at least one voxel corresponding to the specified voxel position in the attribute layer corresponding to the specified attribute and determines the attribute value of the voxel that corresponds to the specified voxel position and the specified resolution level.

15. The information processing apparatus according to claim 14,
wherein the attribute value is derived by using an attribute value assigned to at least one of a voxel having the same resolution level as the specified resolution level, a voxel having a higher resolution level than the specified resolution level, and a voxel having a lower resolution level than the specified resolution level among the at least one voxel corresponding to the specified voxel position.

16. The information processing apparatus according to claim 15,
wherein the processor derives the attribute value by using statistics.

17. The information processing apparatus according to claim 1,
wherein the processor
acquires the volume data,
accepts an attribute value corresponding to the specified attribute, the specified voxel position, and the specified resolution level, and
if the resolution level of the voxel that corresponds to the specified voxel position in the attribute layer corresponding to the specified attribute is lower than the specified resolution level,
adds a voxel that corresponds to the specified resolution level by dividing the voxel that corresponds to the specified voxel position, and
assigns the attribute value to the added voxel that corresponds to the specified voxel position and the specified resolution level.

18. The information processing apparatus according to claim 17,
wherein, if the voxel that corresponds to the specified voxel position has voxels obtained by dividing the voxel that corresponds to the specified voxel position, the voxels having a higher resolution level than the specified resolution level, in the attribute layer corresponding to the specified attribute, the processor removes the voxels having the higher resolution level and assigns the attribute value to the added voxel that corresponds to the specified voxel position and the specified resolution level.

19. The information processing apparatus according to claim 1,
wherein the processor displays an attribute value in an attribute layer at a position in the geometric layer, the position corresponding to a position in the attribute layer.

20. A non-transitory computer readable medium storing a program causing a computer to execute a process for information processing, the process comprising:
acquiring volume data,
the volume data representing a three-dimensional space by using a plurality of voxels,
the volume data containing a geometric layer and at least one attribute layer,
the geometric layer being formed by geometric voxels included in the plurality of voxels, each of the geometric voxels being assigned a characteristic value representing a three-dimensional shape of a target object,
the at least one attribute layer being formed by attribute voxels included in the plurality of voxels, each of the attribute voxels being assigned an attribute value of the target object or an attribute value in a region around the target object,
each of the at least one attribute layer corresponding to an attribute and being formed by voxels having a plurality of resolution levels,
an attribute, a voxel position, and a resolution level being specified;
accepting the specified attribute, the specified voxel position, and the specified resolution level; and
if a voxel that corresponds to the specified voxel position in an attribute layer corresponding to the specified attribute in the volume data and that corresponds to a resolution level coinciding with the specified resolution level is absent,
determining an attribute value of the voxel that corresponds to the specified voxel position and the specified resolution level in the attribute layer corresponding to the specified attribute, the attribute value being determined using a multi-way tree equation set to identify a voxel that corresponds to the specified voxel position at the attribute layer.

* * * * *